US012573665B2

(12) United States Patent
Yang et al.

(10) Patent No.: US 12,573,665 B2
(45) Date of Patent: Mar. 10, 2026

(54) METHOD FOR MANUFACTURING ALL SOLID-STATE LITHIUM BATTERY

(71) Applicant: Ming Chi University of Technology, New Taipei City (TW)

(72) Inventors: Chun-Chen Yang, New Taipei City (TW); Yi-Shiuan Wu, New Taipei City (TW); Hoai-Khang Tran, New Taipei City (TW); Min-Zen Lee, New Taipei City (TW)

(73) Assignee: Ming Chi University of Technology, New Taipei City (TW)

( * ) Notice: Subject to any disclaimer, the term of this patent is extended or adjusted under 35 U.S.C. 154(b) by 730 days.

(21) Appl. No.: 18/153,273

(22) Filed: Jan. 11, 2023

(65) Prior Publication Data

US 2023/0170530 A1 Jun. 1, 2023

Related U.S. Application Data

(63) Continuation-in-part of application No. 16/671,442, filed on Nov. 1, 2019, now abandoned.

(30) Foreign Application Priority Data

Sep. 12, 2019 (TW) .................................. 108132925

(51) Int. Cl.
*H01M 10/058* (2010.01)
*H01M 4/04* (2006.01)
(Continued)

(52) U.S. Cl.
CPC ....... *H01M 10/058* (2013.01); *H01M 4/0404* (2013.01); *H01M 4/139* (2013.01); *H01M 4/366* (2013.01); *H01M 4/62* (2013.01);

*H01M 4/661* (2013.01); *H01M 10/0525* (2013.01); *H01M 10/056* (2013.01); *H01M 2300/0068* (2013.01);
(Continued)

(58) Field of Classification Search
CPC ............ H01M 10/058; H01M 4/0404; H01M 4/139; H01M 4/366; H01M 4/661; H01M 10/0525; H01M 10/056
See application file for complete search history.

(56) References Cited

U.S. PATENT DOCUMENTS 5,705,296 A 1/1998 Kamauchi et al.
6,355,380 B1 3/2002 Yun et al.
(Continued)

FOREIGN PATENT DOCUMENTS

CN 109065945 A 12/2018

OTHER PUBLICATIONS

Garsuch et al., "Studies of Lithium-Exchanged Nation as an Electrode Binder for Alloy Negatives in Lithium-Ion Batteries," J. Electrochem. Soc., 155, pp. A721-A724 (2008).
(Continued)

*Primary Examiner* — Nathanael T Zemui
(74) *Attorney, Agent, or Firm* — Fox Rothschild LLP; Carol E. Thorstad-Forsyth

(57) ABSTRACT

Disclosed herein is a method for manufacturing an all solid-state lithium battery, in which a lithium-substituted Nafion is dispersed in N-methylpyrrolidone in an amount ranging from 0.5 wt % to 5.0 wt % to form a lithium-substituted Nafion dispersion and an active material is dispersed in the lithium-substituted Nafion dispersion in a weight ratio of the lithium-substituted Nafion to the active material ranging from 0.05:100 to 5.00:100.

14 Claims, 6 Drawing Sheets

(51) Int. Cl.

| | | |
|---|---|---|
| *H01M 4/139* | (2010.01) | |
| *H01M 4/36* | (2006.01) | |
| *H01M 4/62* | (2006.01) | |
| *H01M 4/66* | (2006.01) | |
| *H01M 10/0525* | (2010.01) | |
| *H01M 10/056* | (2010.01) | |

(52) U.S. Cl.
  CPC ............... *H01M 2300/0071* (2013.01); *H01M 2300/0082* (2013.01); *H01M 2300/0091* (2013.01)

(56) References Cited

U.S. PATENT DOCUMENTS

| | | |
|---|---|---|
| 2016/0248115 A1 | 8/2016 | Hatta et al. |
| 2020/0335814 A1 | 10/2020 | Lin et al. |

OTHER PUBLICATIONS

Subramania et al, "New polymer electrolyte based on (PVA-PAN) blend for Li-ion battery applications," Ionics, 12, pp. 175-178 (2006).
Subramania et al, "Structural and electrochemical properties of micro-porous polymer blend," Journal of Power Sources, 153, pp. 177-182 (2005).

1

+

21

23

12

121
122
123

13

11

113
112
111

−

22

METHOD FOR MANUFACTURING ALL SOLID-STATE LITHIUM BATTERY

CROSS-REFERENCE TO RELATED APPLICATION

This patent application is a continuation-in-part application of U.S. patent application Ser. No. 16/671,442 filed on Nov. 1, 2019, which claims priority of Taiwanese Patent Application No. 108132925, filed on Sep. 12, 2019.

FIELD

The disclosure relates to a method for manufacturing an all solid-state lithium battery, and more particularly to a method for manufacturing an all solid-state lithium battery including a lithium ion conductive composite material.

BACKGROUND

Lithium ion battery has properties such as a high open circuit voltage, a high energy density, a fast charge/discharge rate, a long charge/discharge cycle life, a low self-discharge, and lightweight, and is commonly used as an energy saving device and a power supplying device for consumer electronic products, transportation facilities, etc. However, liquid electrolyte contained in the lithium ion battery is volatile and flammable, and might have adverse effects on the safety of a user. In addition, lithium dendrite is easily formed after several charge/discharge cycles, which in turn might cause a short circuit of the lithium ion battery.

Although currently available all solid-state lithium battery includes a solid-state electrolyte composite membrane that can prevent safety problems associated with the lithium ion battery, such as leakage of the liquid electrolyte and growth of the lithium dendrite, a high interfacial resistance might be easily produced due to poor interfacial contact between the solid-state electrolyte composite membrane and the electrodes of the all solid-state lithium battery. In addition, the solid-state electrolyte composite membrane generally has low lithium ion conductivity (for example, in an order of $10^{-7}$ S/cm) at room temperature, and thus, cannot provide the all solid-state lithium battery with superior performance.

SUMMARY

Therefore, an object of the disclosure is to provide a method for manufacturing an all solid-state lithium battery to overcome the shortcomings described above.

A method for manufacturing an all solid-state lithium battery according to the disclosure includes:

dispersing a lithium-substituted Nafion in N-methylpyrrolidone in an amount ranging from 0.5 wt % to 5.0 wt % based on 100 wt % of N-methylpyrrolidone to form a lithium-substituted Nafion dispersion;

applying the lithium-substituted Nafion dispersion on a first metal foil so as to form the lithium-substituted Nafion on the first metal foil;

applying a first lithium ion conductive composite material on the lithium-substituted Nafion formed on the first metal foil to obtain an anode sheet;

dispersing an active material in the lithium-substituted Nafion dispersion in a weight ratio of the lithium-substituted Nafion to the active material ranging from 0.05:100 to 5.00:100, so as to obtain a powdery material of the active material coated with the lithium-substituted Nafion;

preparing a mixture slurry material including the powdery material, an electron-conductive agent, and a binder;

applying the mixture slurry material on a second metal foil so as to form a sheet;

applying a second lithium ion conductive composite material on a surface of the sheet opposite to the second metal foil, so as to obtain a cathode sheet;

preparing a solid polymer electrode composite membrane including a third lithium ion conductive composite material; and packaging the anode sheet, the cathode sheet, and the solid polymer electrode composite membrane.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
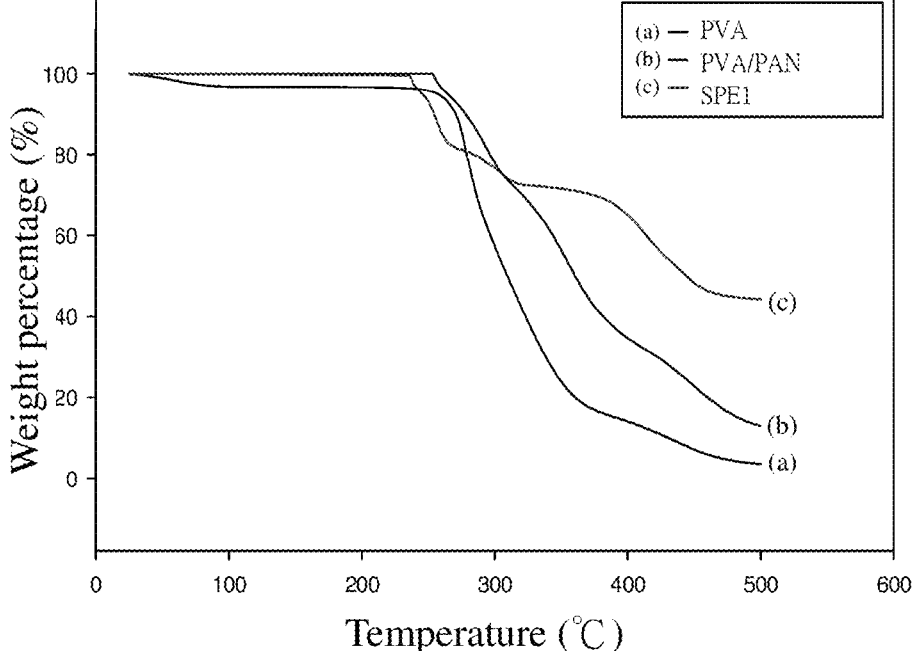
FIG. 1 is a graph illustrating thermogravimetric analysis results of polyvinyl alcohol (PVA), a polymer blend of polyvinyl alcohol and polyacrylonitrile (PVA/PAN), and a solid polymer electrolyte composite membrane (SPE1) sample of Example 1.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," and the like may be used throughout the disclosure while making reference to the features as illustrated in the drawings. The features may be oriented differently (e.g., rotated 90 degrees or at other orientations) and the spatially relative terms used herein may be interpreted accordingly.

A method for manufacturing an all solid-state lithium battery according to the disclosure includes:

dispersing a lithium-substituted Nafion in N-methylpyrrolidone in an amount ranging from 0.5 wt % to 5.0 wt % based on 100 wt % of N-methylpyrrolidone to form a lithium-substituted Nafion dispersion;

applying the lithium-substituted Nafion dispersion on a first metal foil so as to form the lithium-substituted Nafion on the first metal foil;

applying a first lithium ion conductive composite material on the lithium-substituted Nafion formed on the first metal foil to obtain an anode sheet;

dispersing an active material in the lithium-substituted Nafion dispersion in a weight ratio of the lithium-substituted Nafion to the active material ranging from 0.05:100 to 5.00:100, so as to obtain a powdery material of the active material coated with the lithium-substituted Nafion;

preparing a mixture slurry material including the powdery material, an electron-conductive agent, and a binder;

applying the mixture slurry material on a second metal foil so as to form a sheet;

applying a second lithium ion conductive composite material on a surface of the sheet opposite to the second metal foil, so as to obtain a cathode sheet;

preparing a solid polymer electrode composite membrane including a third lithium ion conductive composite material; and packaging the anode sheet, the cathode sheet, and the solid polymer electrode composite membrane.

If the amount of lithium-substituted Nafion dispersed in N-methylpyrrolidone is less than 0.5 wt % based on 100 wt % of N-methylpyrrolidone, it is difficult to form a uniform coating layer of the lithium-substituted Nafion on the first and/or second metal foils. If the amount of lithium-substituted Nafion dispersed in N-methylpyrrolidone is greater than 5.0 wt % based on 100 wt % of N-methylpyrrolidone, resistance of the all solid-state lithium battery thus manufactured is increased undesirably due to a relatively greater thickness of the coating layer of the lithium-substituted Nafion on the first and/or second metal foils.

If the weight ratio of the lithium-substituted Nafion to the active material is less than 0.05:100, it is difficult to form a uniform coating layer of the lithium-substituted Nafion on the active material. If the weight ratio of the lithium-substituted Nafion to the active material is greater than 5.00:100, resistance of the all solid-state lithium battery thus manufactured is increased undesirably.

In certain embodiments, the lithium-substituted Nafion is dispersed in N-methylpyrrolidone in an amount ranging from 0.5 wt % to 2.0 wt % based on 100 wt % of N-methylpyrrolidone.

In certain embodiments, the active material is dispersed in the lithium-substituted Nafion dispersion in a weight ratio of the lithium-substituted Nafion to the active material ranging from 0.10:100 to 2.00:100.

In certain embodiments, each of the first lithium ion conductive composite material, the second lithium ion conductive composite material, the third lithium ion conductive composite material, and the binder independently includes a polymer blend, a lithium salt, a lithium ion conductive ceramic filler, and a plasticizer. The polymer blend includes polyacrylonitrile and a polyvinyl polymer selected from the group consisting of polyvinyl alcohol, poly(vinylidene fluoride-hexafluoropropylene), and a combination thereof.

In certain embodiments, the polymer blend includes polyacrylonitrile and polyvinyl alcohol.

In certain embodiments, polyacrylonitrile is in an amount ranging from 5 wt % to 95 wt % and polyvinyl alcohol is in an amount ranging from 95 wt % to 5 wt % based on 100 wt % of the polymer blend.

In certain embodiments, polyacrylonitrile is in an amount ranging from 5 wt % to 20 wt % and polyvinyl alcohol is in an amount ranging from 95 wt % to 80 wt % based on 100 wt % of the polymer blend. In some examples illustrated below, polyacrylonitrile is in an amount of 7.5 wt % and polyvinyl alcohol is in an amount of 92.5 wt % based on 100 wt % of the polymer blend.

In certain embodiments, the polyvinyl polymer is poly (vinylidene fluoride-hexafluoropropylene), and polyacrylonitrile is in an amount ranging from 5 wt % to 20 wt % and poly(vinylidene fluoride-hexafluoropropylene) is in an amount ranging from 95 wt % to 80 wt % based on 100 wt % of the polymer blend. In some examples illustrated below, polyacrylonitrile is in an amount of 10 wt % and poly (vinylidene fluoride-hexafluoropropylene) is in an amount of 90 wt % based on 100 wt % of the polymer blend.

In certain embodiments, the polymer blend is in an amount ranging from 30 wt % to 40 wt % based on 100 wt % of a combination of the polymer blend, the lithium salt, and the lithium ion conductive ceramic filler. In examples illustrated below, the polymer blend is in an amount of 40 wt % based on 100 wt % of the combination of the polymer blend, the lithium salt, and the lithium ion conductive ceramic filler.

In certain embodiments, the lithium salt is in an amount ranging from 30 wt % to 50 wt % based on 100 wt % of the combination of the polymer blend, the lithium salt, and the lithium ion conductive ceramic filler. In examples illustrated below, the lithium salt is in an amount of 40 wt % based on 100 wt % of the combination of the polymer blend, the lithium salt, and the lithium ion conductive ceramic filler.

In certain embodiments, the lithium ion conductive ceramic filler is in an amount ranging from 1 wt % to 30 wt % based on 100 wt % of the combination of the polymer blend, the lithium salt, and the lithium ion conductive ceramic filler. In examples illustrated below, the lithium ion conductive ceramic filler is in an amount of 20 wt % based on 100 wt % of the combination of the polymer blend, the lithium salt, and the lithium ion conductive ceramic filler.

In certain embodiments, the plasticizer is in an amount ranging from 1 wt % to 40 wt % based on 100 wt % of the polymer blend. In examples illustrated below, the plasticizer is in an amount of 10 wt % based on 100 wt % of the polymer blend.

In certain embodiments, the lithium salt is selected from the group consisting of lithium bis-trifluoromethanesulfonimide (LiTFSI), lithium perchlorate ($LiClO_4$), lithium trifluoromethanesulfonate ($CF_3SO_3Li$), lithium bis(oxalato) borate (LiBOB), lithium tetrafluoroborate ($LiBF_4$), and combinations thereof. In some examples illustrated below, LiTFSI is used as the lithium salt, and in some other examples illustrated below, $LiClO_4$ is used as the lithium salt.

In certain embodiments, the lithium ion conductive ceramic filler is selected from the group consisting of lithium aluminum titanium phosphate (LATP), lithium aluminum germanium phosphate (LAGP), lithium lanthanum zirconium oxide (LLZO), aluminum-doped lithium lanthanum zirconium oxide (Al-LLZO), gallium-doped lithium lanthanum zirconium oxide (Ga-LLZO), niobium-doped lithium lanthanum zirconium oxide (Nb-LLZO), lithium lanthanum zirconium tantalum oxide (LLZTO), lithium lanthanum titanium oxide (LLTO), lithium phosphorous oxynitride (LiPON), and combinations thereof. In some examples illustrated below, LATP is used as the lithium ion conductive ceramic filler, and in some other examples illustrated below, Al-LLZO is used as the lithium ion conductive ceramic filler.

The plasticizer is used to enhance dissociation of the lithium salt. In certain embodiments, the plasticizer is selected from the group consisting of succinonitrile (SN), adiponitrile, lithium azide (LiN$_3$), poly(ethylene glycol) (PEG), poly(ethylene glycol) diacrylate (PEGDA), triallyl isocyanurate (TAIC), and combinations thereof. In examples illustrated below, succinonitrile is used as the plasticizer.

In some embodiments, the first metal foil includes a lithium foil, and the second metal foil includes an aluminum foil.

Examples of the active material include, but are not limited to, lithium-containing multinary compounds such as lithium iron phosphate (LFP), lithium manganese phosphate (LMP), lithium iron manganese phosphate (LFMP), lithium iron manganese cobalt phosphate (LFMCP), lithium vanadium phosphate (LVP), lithium nickel cobalt aluminum oxide (LNCAO), lithium nickel cobalt manganese oxide (LNCMO), lithium nickel manganese oxide (LNMO), lithium cobalt oxide (LCO), and lithium-rich oxide. In an example illustrated below, LFP, LNCAO, and LNCMO are used as the active material. Examples of the electron-conductive agent include, but are not limited to, conductive carbon black, vapor grown carbon fibers (VGCF), and multi-wall carbon nanotube (MWCNT). A non-limiting example of the binder is a mixture solution containing the polymer blend (for example, PVA/PAN), the lithium salt (for example, LiTFSI), the lithium ion conductive ceramic filler (for example, LATP), and the plasticizer (for example, SN) as described above.

Examples of the disclosure will be described hereinafter. It is to be understood that these examples are exemplary and explanatory and should not be construed as a limitation to the disclosure.

Before the examples of the disclosure are described in greater detail, it should be noted that where considered appropriate, reference numerals or terminal portions of reference numerals have been repeated among the figures to indicate corresponding or analogous elements, which may optionally have similar characteristics.

Example 1: Preparation of a Lithium Ion Conductive Composite Material and a Solid Polymer Electrolyte Polyvinyl alcohol (PVA, $M_w = 8.9 \times 10^5$, commercially available from Sigma-Aldrich) was mixed with polyacrylonitrile (PAN, $M_w = 1.5 \times 10^5$, commercially available from Sigma-Aldrich) in a weight ratio of PVA to PAN of 92.5:7.5 to obtain a polymer blend (PVA/PAN). The polymer blend (PVA/PAN) was mixed with lithium bis-trifluoromethanesulfonimide (LiTFSI, commercially available from Sigma-Aldrich), followed by dissolution in dimethyl sulfoxide (DMSO, commercially available from Sigma-Aldrich) as a solvent to obtain a mixture solution in DMSO. After that, lithium aluminum titanium phosphate (LATP) and succinonitrile (SN, commercially available from Sigma-Aldrich) were added to the mixture solution in DMSO under stirring in a weight ratio of PVA/PAN to LiTFSI to LATP to SN of 4:4:2:0.4, followed by heating to a temperature of 80° C. and maintaining the temperature under stirring for 24 hours, so as to obtain a lithium ion conductive composite mixture in a solution form.

The lithium ion conductive composite mixture in the solution form was stirred evenly, and then applied on a glass substrate, followed by drying at 25° C. for 24 hours, and was further dried under vacuum at 70° C. for 72 hours to fully evaporate the DMSO solvent, so as to obtain a solid polymer electrolyte composite membrane (SPE1) sample having a thickness of about 100 μm to 200 μm.

The solid polymer electrolyte composite membrane (SPE1) sample that had been subjected to complete drying was cut to obtain a circular composite membrane having a diameter of 18 mm. The circular composite membrane was stored under an argon atmosphere.

Example 2: Preparation of a Lithium Ion Conductive Composite Material and a Solid Polymer Electrolyte Lithium nitrate (LiNO$_3$, commercially available from Alfa Aesar), aluminum nitrate (Al(NO$_3$)$_3$·9H$_2$O, commercially available from Alfa Aesar), and lanthanum nitrate (La(NO$_3$)$_3$·6H$_2$O, commercially available from Alfa Aesar) were mixed in deionized water under stirring for 30 minutes, in a molar ratio of lithium nitrate to aluminum nitrate to lanthanum nitrate of 6.25:0.25:3, so as to obtain a first solution.

Zirconium tetrapropoxide (a 70 wt % solution in propanol, commercially available from Sigma-Aldrich) was dissolved in a solution of 15 vol % of acetic acid in isopropanol, such that a molar ratio of La to Zr was 3:2, followed by addition of an excess amount of lithium nitrate until a concentration thereof was 15 wt % to compensate lithium loss during sintering at an elevated temperature, thereby obtaining a second solution.

The first solution was mixed with the second solution under stirring for 30 minutes to obtain a mixture solution of aluminum-doped lithium lanthanum zirconium oxide (Al-LLZO). A graphite nanofiber mat was immersed in the solution of Al-LLZO for 12 hours. Thereafter, the graphite nanofiber mat was removed from the mixture solution of Al-LLZO, dried at 90° C. for 12 hours, and heated in air at a heating rate of 2° C./min to a temperature of 800° C., followed by sintering at the temperature for 2 hours, so as to obtain a powdery material of Al-LLZO (Li$_{6.25}$Al$_{0.25}$La$_3$Zr$_2$O$_{12}$) as a lithium ion ceramic filler.

Lithium perchlorate (LiClO$_4$, commercially available from Alfa Aesar) was mixed with poly(vinylidene fluoride-hexafluoropropylene) (PVDF-HFP, $M_w = 4 \times 10^5$, commercially available from Sigma-Aldrich) in N,N-dimethylformamide (DMF, commercially available from Sigma-Aldrich) solvent under stirring for 12 hours at 60° C. in a weight ratio of LiClO$_4$ to PVDF-HFP of 1:1.8, so as to obtain a first mixture (LiClO$_4$/PVDF-HFP) solution.

Polyacrylonitrile (PAN), the powdery material of Al-LLZO, and succinonitrile (SN) were all mixed in DMF under stirring at 60° C. for 12 hours in a weight ratio of PAN to Al-LLZO to SN of 0.2:0.75:0.2, so as to obtain a second mixture (PAN/Al-LLZO/SN) solution.

The first mixture solution was mixed with the second mixture solution under stirring for 1 hour, followed by milling using a ball mill (commercially available from Fritsch GmbH, Germany) at a rate of 400 rpm for 5 hours, so as to obtain a lithium ion conductive composite material as a mixed solution.

The lithium ion conductive composite material was applied on a glass substrate, followed by drying at 25° C. for 12 hours, and further drying under vacuum at 80° C. for 48 hours to obtain a solid polymer electrolyte composite membrane (SPE2) sample. The solid polymer electrolyte composite membrane sample that had been subjected to complete drying was punched to obtain a circular composite membrane having a diameter of 18 mm and a thickness of about 100 μm to 200 μm.

Example 3: Preparation of a Lithium Ion Conductive Composite Material and a Solid Polymer Electrolyte PVA, the powdery material of Al-LLZO of Example 2, and LiTFSI were mixed and dissolved in DMSO solvent to obtain a first mixture (PVA/Al-LLZO/LiTFSI) solution. PAN and SN were mixed and dissolved in DMSO solvent to obtain a second mixture (PAN/SN) solution.

The first mixture solution was mixed with the second mixture solution such that a weight ratio of PVA to PAN was 92.5:7.5, and that a weight ratio of (PVA+PAN) to LiTFSI to Al-LLZO to SN was 4:4:2:0.4, followed by heating to a temperature of 80° C., maintaining at the temperature under stirring for 24 hours, and then milling using a ball mill at a rate of 400 rpm for 2 hours, so as to obtain a lithium ion conductive composite mixture as a mixed solution.

The lithium ion conductive composite mixture as the mixed solution was applied on a glass substrate, followed by drying at 25° C. for 24 hours, and further drying under vacuum at 70° C. for 72 hours to obtain a solid polymer electrolyte composite membrane (SPE3) sample. The solid polymer electrolyte composite membrane sample that had been subjected to complete drying was punched to obtain a circular composite membrane having a diameter of 18 mm and a thickness of about 100 μm to 200 μm.

Thermogravimetric Analysis (TGA):

The weights of PVA, PVA/PAN, and the SPE1 sample of Example 1 as a function of temperature were measured by thermogravimetry under a nitrogen atmosphere. The results are shown in FIG. 1.

As shown in FIG. 1, the weight loss ratios of PVA and PVA/PAN after a heating procedure that was conducted from 25° C. to 500° C. were 93.1% and 86.3%, respectively. In comparison, the weight loss ratio of the SPE1 sample after the heating procedure is only 54.8%. It is indicated that the SPE1 sample has superior thermal stability.

Measurement of Lithium Ion Conductivity:

A solid polymer electrolyte composite membrane (SPE1') sample was prepared according to the procedure for preparing the SPE1 sample, except that the weight ratio of PVA/ PAN to LiTFSI to LATP to SN was changed to 4:4:2:0. Another solid polymer electrolyte composite membrane (SPE1") sample was also prepared according to the procedure for preparing the SPE1 sample, except that the weight ratio of PVA/PAN to LiTFSI to LATP to SN was changed to 4:3:3:0. Lithium ion conductivities (S/cm) of the SPE1, SPE1', and SPE1" samples were measured at a temperature ranging from 25° C. to 80° C. by AC impedance spectroscopy. The results are shown in Table 1 below.

As shown in Table 1, at the same temperature range, the lithium ion conductivity of the SPE1 sample of Example 1 is significantly higher than those of the SPE' and SPE" samples, which do not include SN.

In addition, the lithium ion conductivities of the SPE2 and SPE3 samples of Examples 2 and 3 at 25° C. were measured to be about $1.19 \times 10^{-4}$ S/cm and $1.17 \times 10^{-4}$ S/cm, respectively.

Figure 2:
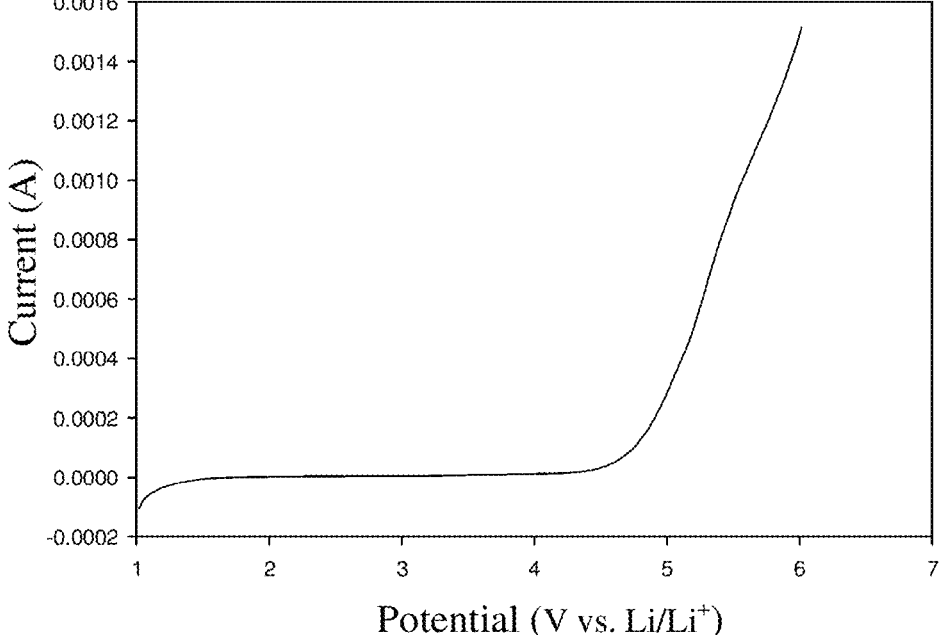
FIG. 2 is a graph illustrating a potential-current relationship of SPE1 sample of Example 1 determined by linear sweep voltammetry.

Analysis of Linear Sweep Voltammetry (LSV):

The SPE1 sample of Example 1 was subjected to linear sweep voltammetry analysis at a sweep rate of 1.0 mV/s and a sweep potential ranging from 1 V to 6 V (vs. Li/Li+). The results are shown in FIG. 2, As shown in FIG. 2, the SPE1 sample of Example 1 has a wide electrochemical window, and a superior interfacial chemical stability with lithium metal.

Application Example 1: Preparation of an all Solid-State Lithium Battery (LB$_{E1}$)

The lithium ion conductive composite material of Example 1 was applied on a surface of a lithium foil having a diameter of 16 mm and a thickness of 0.45 mm to obtain an anode sheet.

Lithium iron phosphate (LFP, commercially available from Formosa Lithium Iron Oxide Corp., Taiwan), conductive carbon black Super P® (an average particle size: 30 nm, a specific surface area: 50 m²/g, commercially available from Timcal Ltd., Switzerland), vapor grown carbon fibers (VGCF, commercially available from Yonyu Applied Technology Material Co., Ltd., Taiwan), a lithium ion conductive composite material (a weight ratio of PVA/PAN to LiTFSI to LATP of 4:4:2), and SN were prepared at a weight ratio of 70:7.5:2.5:15:5. The lithium ion conductive composite material and SN were evenly stirred in DMSO solvent, followed by adding LFP, conductive carbon black Super P®, and VGCF, which were continuously stirred to obtain a mixture slurry material. The mixture slurry material was applied on an aluminum foil having a thickness of 20 μm, followed by baking in a vacuum oven at 70° C. to remove solvent and steam, followed by rolling using a roller to obtain a sheet having a thickness of about 49 μm (a surface density: about 4.1 mg/cm², a packing density: about 1.4 g/cm³), and then cutting the sheet to obtain a circular sheet having a diameter of 13 mm. A surface of the circular sheet opposite to the aluminum foil was applied with the lithium ion conductive composite material of Example 1 in an amount of 5 μL, thereby obtaining a cathode sheet.

The SPE1 sample of Example 1 was used as a solid polymer electrolyte composite membrane.

Figure 3:
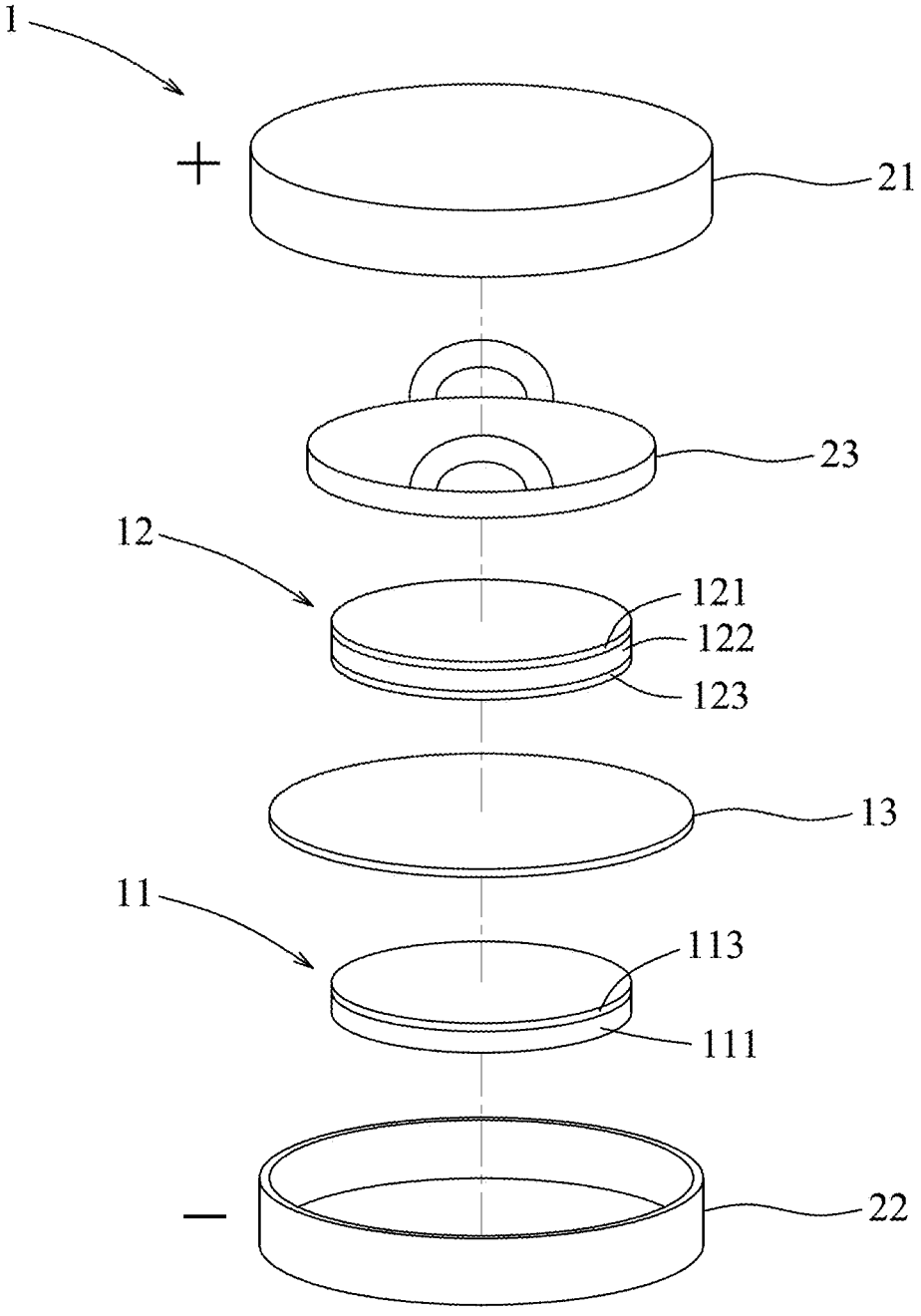
FIG. 3 is a schematic exploded perspective view of an all solid-state lithium battery of each of Application Examples 1 to 7 and Comparative Application Examples 2 and 3.

Referring to FIG. 3, an anode sheet 11 (i.e., the anode sheet prepared above, including the lithium foil as an anode 111 and the lithium ion conductive composite material as a lithium ion conductive layer 113), a cathode sheet 12 (i.e.,

TABLE 1

| Sample | Temperature (° C.) | | | | | |
|---|---|---|---|---|---|---|
| | 25 | 40 | 50 | 60 | 70 | 80 |
| SPE1 | $9.53 \times 10^{-5}$ | $2.37 \times 10^{-4}$ | $4.10 \times 10^{-4}$ | $5.40 \times 10^{-4}$ | $6.90 \times 10^{-4}$ | $8.44 \times 10^{-4}$ |
| SPE1' | $6.72 \times 10^{-6}$ | $1.89 \times 10^{-5}$ | $4.87 \times 10^{-5}$ | $8.82 \times 10^{-5}$ | $1.17 \times 10^{-4}$ | $1.51 \times 10^{-4}$ |
| SPE1" | $6.27 \times 10^{-7}$ | $1.16 \times 10^{-6}$ | $2.24 \times 10^{-6}$ | $4.84 \times 10^{-6}$ | $8.36 \times 10^{-6}$ | $1.15 \times 10^{-5}$ | the cathode sheet prepared above, including an aluminum foil 121, a cathode 122, and the lithium ion conductive composite material as a lithium ion conductive layer 123), a solid polymer electrolyte composite membrane 13 (i.e., the solid polymer electrolyte composite membrane prepared above), and remaining components of a 2032 coil battery that includes a top cover 21, a bottom cover 22, and a spring 23, were packaged using a clamp in an argon atmosphere to obtain an all solid-state lithium battery 1 (denoted as $LB_{E1}$).

Application Examples 2 and 3: Preparation of all Solid-State Lithium Batteries ($LB_{E2}$ and $LB_{E3}$)

The all solid-state lithium batteries (denoted as $LB_{E2}$ and $LB_{E3}$) of Application Examples 2 and 3 were prepared according to the procedures of Application Example 1, except that lithium nickel cobalt aluminum oxide (LNCAO, commercially available from UbiQ Technology Co., Ltd., Taiwan) and lithium nickel cobalt manganese oxide (LNCM0811, commercially available from UbiQ Technology Co., Ltd., Taiwan) were used in Application Examples 2 and 3, respectively, to substitute for LFP in Application Example 1. The cathode sheet in the all solid-state lithium battery ($LB_{E2}$) of Application Example 2 had a sheet thickness of about 43 μm (a surface density: about 4.5 mg/cm$^2$, a packing density: about 2.0 g/cm$^3$), and the cathode sheet in the all solid-state lithium battery ($LB_{E3}$) of Application Example 3 had a sheet thickness of about 40 μm (a surface density: about 4.6 mg/cm$^2$, a packing density: about 2.3 g/cm$^3$).

Application Examples 4 to 6: Preparation of all Solid-State Lithium Batteries ($LB_{E4}$, $LB_{E5}$, and $LB_{E6}$)

The all solid-state lithium batteries (denoted as $LB_{E4}$, $LB_{E5}$, and $LB_{E6}$) of Application Examples 4 to 6 were prepared according to the procedures of Application Examples 1 to 3, respectively, except that the SPE3 sample of Example 3 was used as the solid polymer electrolyte composite membrane in each of Application Examples 4 to 6.

Application Example 7: Preparation of an all Solid-State Lithium Battery ($LB_{E7}$)

The all solid-state lithium battery (denoted as $LB_{E7}$) of Application Example 7 was prepared according to the procedures of Application Example 3, except that the SPE2 sample of Example 2 was used as the solid polymer electrolyte composite membrane.

Application Example 8: Preparation of an all Solid-State Lithium Battery ($LB_{E5}$)

Lithium hydroxide monohydrate (LiOH·H$_2$O, commercially available from Wako Pure Chemical Industries, Ltd.) was mixed with a Nafion solution (an amount of 5 wt % in a mixture solvent of aliphatic alcohol and water, commercially available from Sigma-Aldrich) in a weight ratio of the lithium hydroxide monohydrate to the Nafion solution of 1:17, followed by stirring at 60° C. for 2 hours and vacuum drying in an oven at 80° C. for 24 hours to obtain a so-called lithium-substituted Nafion (denoted as Li-Nafion). Li-Nafion was dispersed in an amount of 1 wt % in N-methylpyrrolidone (NMP) to form a dispersion of Li-Nafion in NMP, and 5 μL of the dispersion was applied on a lithium foil having a diameter of 16 mm and a thickness of 0.45 mm using a micropipette, followed by drying at 55° C. for 24 hours and applying 5 μL of the lithium ion conductive composite material of Example 1 on Li-Nafion, so as to obtain an anode sheet.

A powdery material of LNCMO811 (as an active material of a cathode) was dispersed in a dispersion of Li-Nafion in an amount of 1 wt % in NMP, such that a weight ratio of Li-Nafion to the active material was 0.5:100, followed by stirring at 60° C. for 2 hours, vacuum filtering, and drying under vacuum at 90° C. for 24 hours, so as to obtain a powdery material of LNCMO811 coated with a Li-Nafion layer.

The powdery material of LNCMO811 coated with Li-Nafion, conductive carbon black Super P®, VGCF, a lithium ion conductive composite material (a weight ratio of PVA/PAN to LiTFSI to LATP of 4:4:2), and SN were prepared at a weight ratio of 70:7.5:2.5:15:5. The lithium ion conductive composite material and SN were evenly stirred in DMSO solvent, followed by adding the powdery material of LNCMO811 coated with Li-Nafion, conductive carbon black Super P®, and VGCF, which were continuously stirred to obtain a mixture slurry material. The mixture slurry material was applied on an aluminum foil having a thickness of 20 μm, followed by baking in a vacuum oven at 70° C. to remove solvent and steam, followed by rolling using a roller to obtain a sheet having a thickness of about 40 μm (a surface density: about 4.6 mg/cm$^2$, a packing density: about 2.3 g/cm$^3$), and then cutting the sheet to obtain a circular sheet having a diameter of 13 mm. A surface of the circular sheet opposite to the aluminum foil was applied with the lithium ion conductive composite material of Example 1 in an amount of 5 μL, thereby obtaining a cathode sheet.

The SPE1 sample of Example 1 was used as a solid polymer electrolyte composite membrane.

Figure 4:
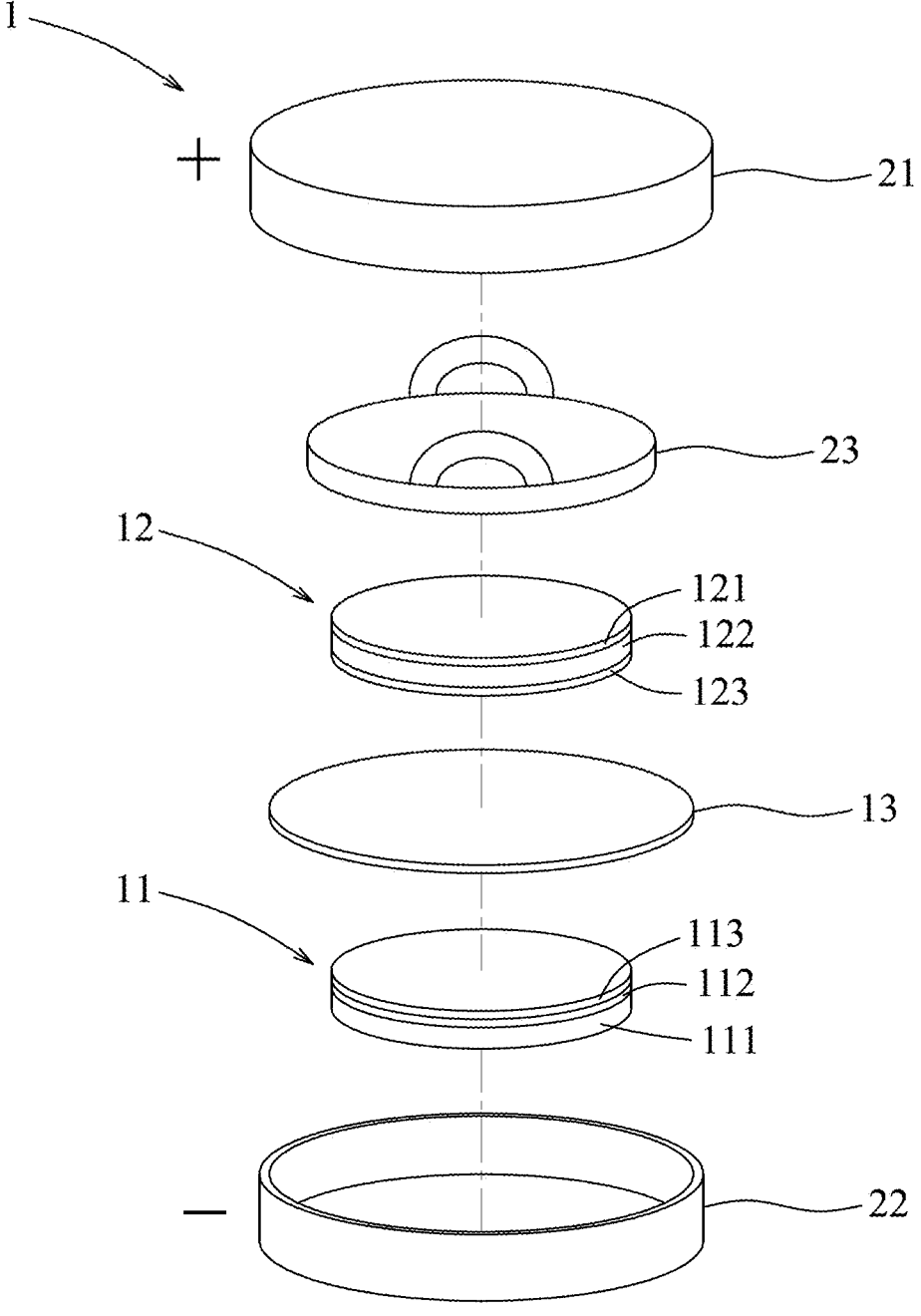
FIG. 4 is a schematic exploded perspective view of an all solid-state lithium battery of Application Example 8.

Referring to FIG. 4, an anode sheet 11 (i.e., the anode sheet prepared above, including the lithium foil as an anode 111, Li-Nafion 112, the lithium ion conductive composite material as a lithium ion conductive layer 113), a cathode sheet 12 (i.e., the cathode sheet prepared above, including an aluminum foil 121, a cathode 122, and the lithium ion conductive composite material as a lithium ion conductive layer 123), a solid polymer electrolyte composite membrane 13 (i.e., the solid polymer electrolyte composite membrane prepared above), and remaining components of a 2032 coil battery that includes a top cover 21, a bottom cover 22, and a spring 23, were packaged using a clamp in an argon atmosphere to obtain an all solid-state lithium battery 1 (denoted as $LB_{E8}$).

Comparative Application Example 1: Preparation of a Lithium Ion Battery ($LIB_{CE1}$)

A lithium foil having a diameter of 16 mm and a thickness of 0.45 mm was used as an anode sheet.

The circular sheet obtained in Application Example 1 was used as a cathode sheet.

A polyethylene separator (a thickness of 16 μm, commercially available from Asahi Kasei Corp., Japan), which was immersed in a 1 M solution of LiPF$_6$ in a mixture solvent of ethylene carbonate (EC) and diethyl carbonate (DEC) (a volume ratio of EC to DEC: 1:1), was used as an electrolyte membrane.

Figure 5:
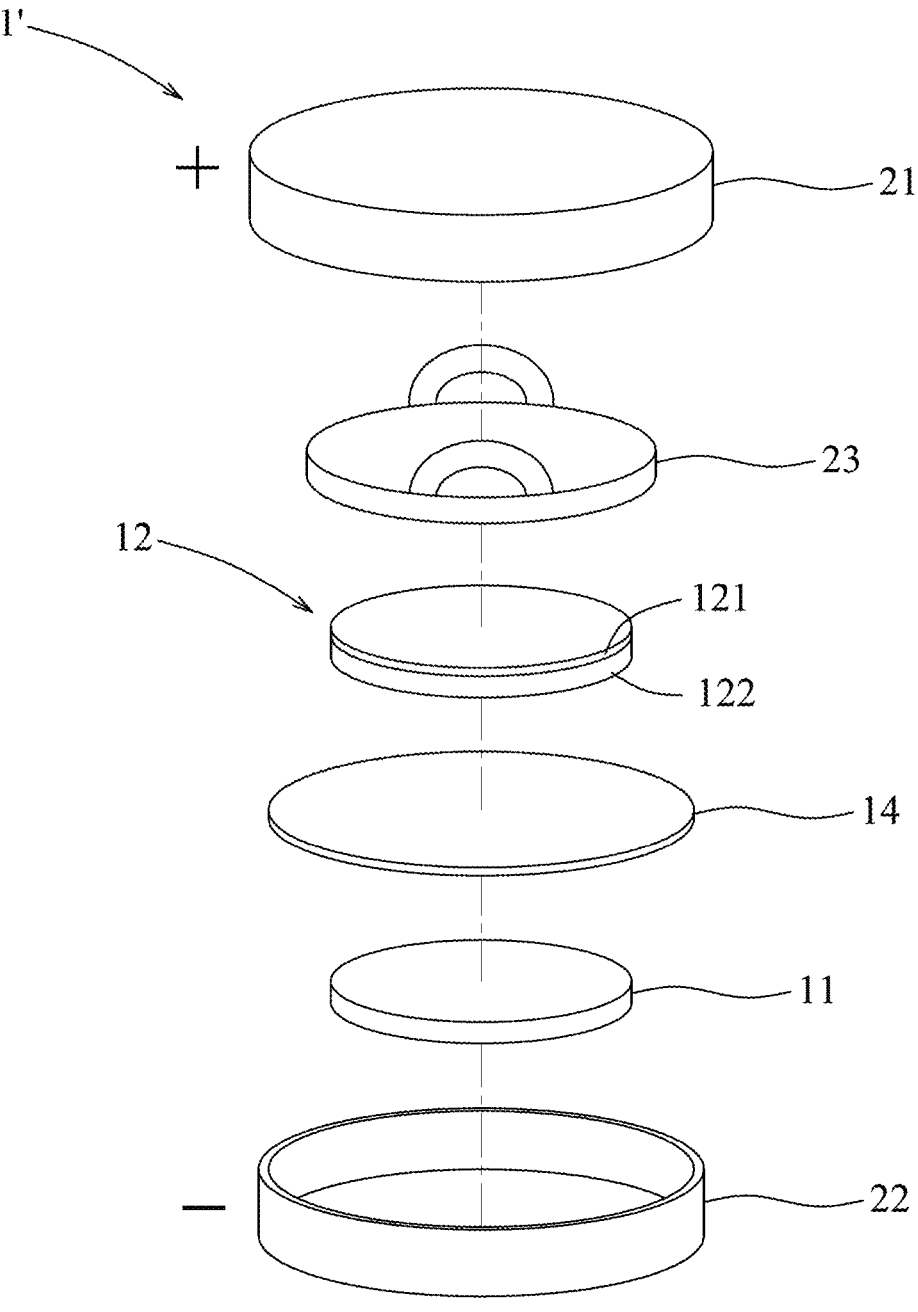
FIG. 5 is a schematic exploded perspective view of a lithium ion battery of Comparative Application Example 1.

Referring to FIG. 5, an anode sheet 11 (i.e., the anode sheet prepared above), a cathode sheet 12 (i.e., the cathode sheet prepared above, including an aluminum foil 121 and a cathode 122), a separator 14 (i.e., the polyethylene separator prepared above), and remaining components of a 2032 coil battery that includes a top cover 21, a bottom cover 22, and a spring 23, were packaged in an argon atmosphere to obtain a lithium ion battery 1' (denoted as $LIB_{CE1}$).

Comparative Application Examples 2 and 3: Preparation of all Solid-State Lithium Batteries ($LB_{CE2}$ and $LB_{CE3}$)

Figure 6:
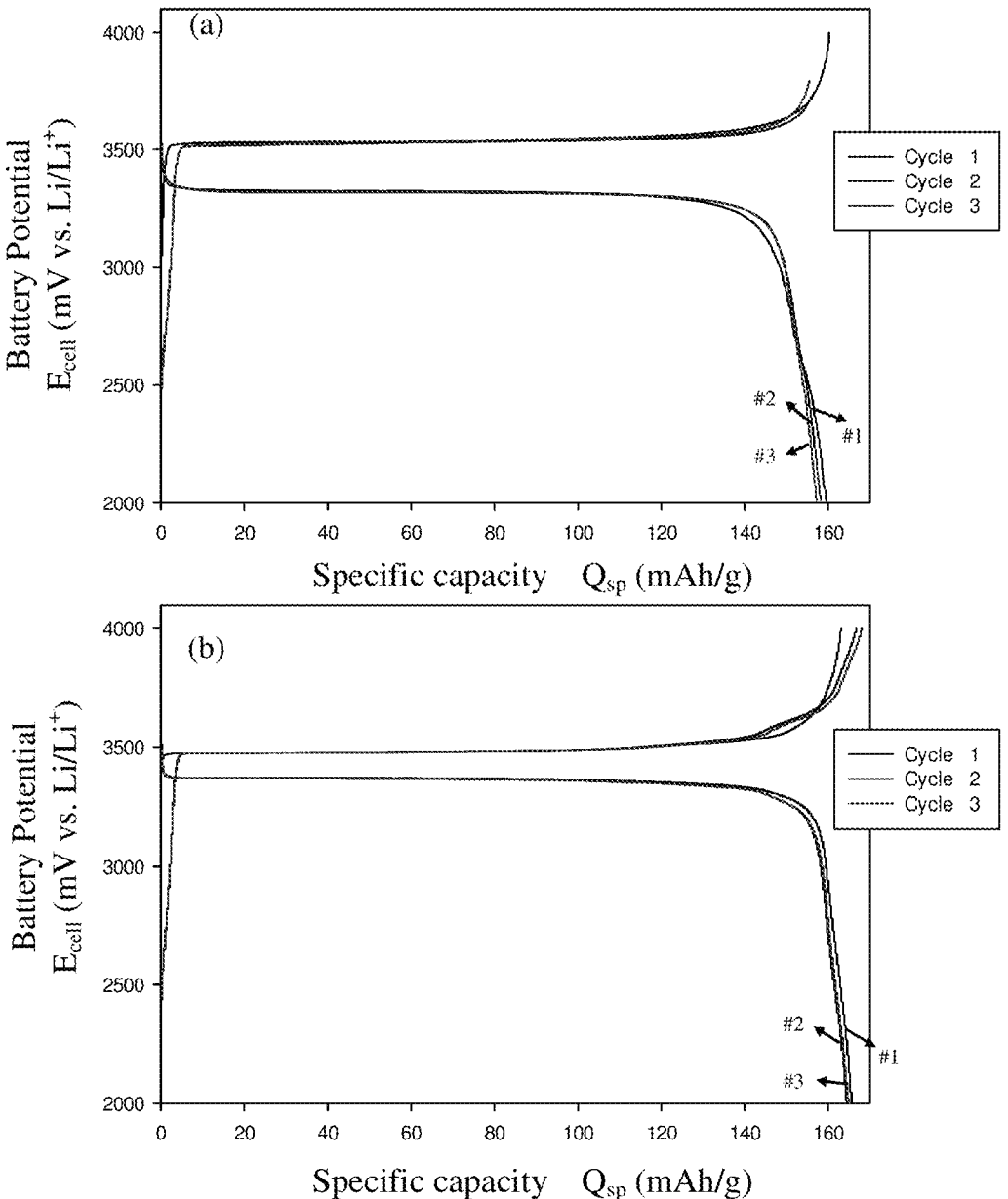
FIG. 6 depicts graphs illustrating charge/discharge specific capacity-potential relationship for the all solid-state lithium battery of Application Example 1 for 3 charge/discharge cycles, in which graph (a) represents the result determined at 25° C., and graph (b) represents the result determined at 60° C.

The all solid-state lithium batteries (denoted as $LB_{CE2}$ and $LB_{CE3}$) of Comparative Application Examples 2 and 3 were prepared according to the procedures of Application Examples 2 and 3, respectively, except that in the lithium ion conductive composite material of each of Comparative Application Examples 2 and 3, a weight ratio of PVA/PAN to LiTFSI to LATP to SN was 4:4:2:0. Measurement of electrical properties of all solid-state lithium batteries and lithium ion battery:

The charge/discharge specific capacity ($Q_{sp}$) of each of the all solid-state lithium batteries of Application Examples 1 to 8 and Comparative Application Examples 2 and 3, and the lithium ion battery of Comparative Application Example 1 was measured using a battery automatic tester (Model: BAT-750B, commercially available from Acutech Systems Co., Ltd., Taiwan) at a charge current of 0.1 C and a discharge current of 0.1 C. Coulombic efficiency (CE %) was calculated according to Equation 1 shown below, and discharge capacity retention (CR %) after 30 charge/discharge cycles was calculated according to Equation 2 shown below. The charge/discharge conditions during measurements and the thus obtained results are shown in Tables 2 to 5 below. Graphs illustrating charge/discharge specific capacity-potential relationship over 3 charge/discharge cycles for the all solid-state lithium battery of Application Example 1 are shown in FIG. 6, in which graph (a) represents the result determined at 25° C., and graph (b) represents the result determined at 60° C.

$$CE\% = [(Q_{sp})_{discharge,n^{th}cycle}/(Q_{sp})_{charge,n^{th}cycle}] \times 100\% \qquad (1)$$

$$CR\% = [(Q_{sp})_{discharge,30^{th}cycle}/(Q_{sp})_{discharge,1^{st}cycle}] \times 100\% \qquad (2)$$

TABLE 2

| | 25° C. | | | 60° C. | | |
|---|---|---|---|---|---|---|
| | | 3 cycles | | | 3 cycles | |
| | 1 cycle $(Q_{sp})_{discharge}$ (mAh/g) | Average $(Q_{sp})_{discharge}$ (mAh/g) | Average CE % | 1 cycle $(Q_{sp})_{discharge}$ (mAh/g) | Average $(Q_{sp})_{discharge}$ (mAh/g) | Average CE % |
| $LB_{E1}$ | Potential range: from 2.0 V to 4.0 V (vs. Li/Li⁺), 1 C = 170 mAh/g | | | | | |
| | 159.6 | 158.3 | 99.8% | 165.8 | 165.2 | 99.5% |
| $LB_{E2}$ | Potential range: from 2.8 V to 4.3 V (vs. Li/Li⁺), 1 C = 200 mAh/g | | | | | |
| | 108.0 | 115.6 | 86.6% | 138.0 | 125.7 | 74.6% |
| $LB_{E3}$ | Potential range: from 2.5 V to 4.3 V (vs. Li/Li⁺), 1 C = 200 mAh/g | | | | | |
| | 170.5 | 151.4 | 91.2% | 204.8 | 180.3 | 86.7% |
| $LB_{CE2}$ | Potential range: from 2.8 V to 4.3 V (vs. Li/Li⁺), 1 C = 200 mAh/g | | | | | |
| | 110.4 | 109.5 | 87.3% | 121.8 | 105.9 | 29.4% |
| $LB_{CE3}$ | Potential range: from 2.5 V to 4.3 V (vs. Li/Li⁺), 1 C = 200 mAh/g | | | | | |
| | 156.7 | 149.5 | 91.6% | 190.7 | 154.1 | 72.8% |

TABLE 3

| | 25° C. | | | 45° C. | | |
|---|---|---|---|---|---|---|
| | | 3 cycles | | | 3 cycles | |
| | 1 cycle $(Q_{sp})_{discharge}$ (mAh/g) | Average $(Q_{sp})_{discharge}$ (mAh/g) | Average CE % | 1 cycle $(Q_{sp})_{discharge}$ (mAh/g) | Average $(Q_{sp})_{discharge}$ (mAh/g) | Average CE % |
| $LB_{E4}$ | Potential range: from 2.0 V to 4.0 V (vs. Li/Li⁺), 1 C = 170 mAh/g | | | | | |
| | 156.5 | 156.2 | 99.7% | 158.6 | 158.1 | 97.9% |
| $LB_{E5}$ | Potential range: from 2.8 V to 4.2 V (vs. Li/Li⁺), 1 C = 200 mAh/g | | | | | |
| | 166.2 | 164.7 | 92.4% | 184.1 | 186.2 | 90.7% |
| $LB_{E6}$ | Potential range: from 2.5 V to 4.2 V (vs. Li/Li⁺), 1 C = 200 mAh/g | | | | | |
| | 150.9 | 152.4 | 97.3% | 193.8 | 170.6 | 87.0% |

TABLE 4

| | 25° C. | | | |
|---|---|---|---|---|
| | 1 cycle | 30 cycles | | |
| | $(Q_{sp})_{discharge}$ (mAh/g) | $(Q_{sp})_{discharge}$ (mAh/g) | Average CE % | CR % |
| $LB_{E1}$ | Potential range: from 2.0 V to 4.0 V (vs. Li/Li$^+$), 1 C = 170 mAh/g | | | |
| | 159.6 | 157.2 | 100.0% | 98.5% |
| $LB_{CE1}$ | Potential range: from 2.0 V to 4.0 V (vs. Li/Li$^+$), 1 C = 170 mAh/g | | | |
| | 149.3 | 146.3 | 99.9% | 98.0% |

TABLE 5

| | 25° C. | | |
|---|---|---|---|
| | 3 cycles | | |
| | 1 cycle $(Q_{sp})_{discharge}$ (mAh/g) | Average $(Q_{sp})_{discharge}$ (mAh/g) | Average CE % |
| $LB_{E7}$ | Potential range: from 2.5 V to 4.2 V (vs. Li/Li$^+$), 1 C = 200 mAh/g | | |
| | 133.4 | 138.4 | 92.1% |
| $LB_{E8}$ | Potential range: from 2.5 V to 4.2 V (vs. Li/Li$^+$), 1 C = 200 mAh/g | | |
| | 167.0 | 167.6 | 97.8% |

As shown in Table 2, after 3 charge/discharge cycles at 25° C. and 60° C., the average discharge specific capacity of the all solid-state lithium battery (denoted as $LB_{E2}$) of Application Example 2 is much higher than that of the all solid-state lithium battery (denoted as $LB_{CE2}$) of Comparative Application Example 2, and the average discharge specific capacity of the all solid-state lithium battery (denoted as $LB_{E3}$) of Application Example 3 is much higher than that of the all solid-state lithium battery (denoted as $LB_{CE3}$) of Comparative Application Example 3. After 3 charge/discharge cycles at 60° C., the average coulombic efficiency of the all solid-state lithium battery (denoted as $LB_{E2}$) of Application Example 2 is much higher than that of the all solid-state lithium battery (denoted as $LB_{CE2}$) of Comparative Application Example 2, and the average coulombic efficiency of the all solid-state lithium battery (denoted as $LB_{E3}$) of Application Example 3 is much higher than that of the all solid-state lithium battery (denoted as $LB_{CE3}$) of Comparative Application Example 3.

As shown in Table 4, after several charge/discharge cycles, the discharge specific capacity, the average coulombic efficiency, and the discharge capacity retention of the all solid-state lithium battery (denoted as $LB_{E1}$) of Application Example 1 are much higher than those of the lithium ion battery (denoted as $LIB_{CE1}$) of Comparative Application Example 1.

As shown in Tables 2 and 3, after 3 charge/discharge cycles at 25° C., the average discharge specific capacity and the average coulombic efficiency of the all solid-state lithium battery (denoted as $LB_{E5}$) of Application Example 5 are much higher than those of the all solid-state lithium battery (denoted as $LB_{E2}$) of Application Example 2. After 3 charge/discharge cycles at 25° C., the average discharge specific capacity and the average coulombic efficiency of the all solid-state lithium battery (denoted as $LB_{E6}$) of Application Example 6 are much higher than those of the all solid-state lithium battery (denoted as $LB_{E3}$) of Application Example 3.

As shown in Tables 2 and 5, after 3 charge/discharge cycles at 25° C., the average coulombic efficiency of the all solid-state lithium battery (denoted as $LB_{E7}$) of Application Example 7 is much higher than that of the all solid-state lithium battery (denoted as $LB_{E3}$) of Application Example 3. After 3 charge/discharge cycles at 25° C., the average discharge specific capacity and the average coulombic efficiency of the all solid-state lithium battery (denoted as $LB_{E8}$) of Application Example 8 are much higher than those of the all solid-state lithium battery (denoted as $LB_{E3}$) of Application Example 3.

In view of the aforesaid, the solid-state polymer composite electrolyte that includes the lithium ion conductive composite material according to the disclosure has superior thermal stability, high lithium ion conductivity at room temperature and elevated temperature, and a wide electrochemical window. The all solid-state lithium battery that includes the lithium ion conductive composite material according to the disclosure has high discharge specific capacity at room temperature and elevated temperature, high coulombic efficiency, and superior charge/discharge cycle stability (i.e., high discharge capacity retention).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for manufacturing an all solid-state lithium battery, comprising:

dispersing a lithium-substituted Nafion in N-methylpyrrolidone in an amount ranging from 0.5 wt % to 5.0 wt % based on 100 wt % of N-methylpyrrolidone to form a lithium-substituted Nafion dispersion;

applying the lithium-substituted Nafion dispersion on a first metal foil so as to form the lithium-substituted Nafion on the first metal foil;

applying a first lithium ion conductive composite material on the lithium-substituted Nafion formed on the first metal foil to obtain an anode sheet;

dispersing an active material in the lithium-substituted Nafion dispersion in a weight ratio of the lithium-substituted Nafion to the active material ranging from 0.05:100 to 5.00:100, so as to obtain a powdery material of the active material coated with the lithium-substituted Nafion;

preparing a mixture slurry material including the powdery material, an electron-conductive agent, and a binder;

applying the mixture slurry material on a second metal foil so as to form a sheet;

applying a second lithium ion conductive composite material on a surface of the sheet opposite to the second metal foil, so as to obtain a cathode sheet;

preparing a solid polymer electrode composite membrane including a third lithium ion conductive composite material; and packaging the anode sheet, the cathode sheet, and the solid polymer electrode composite membrane.

2. The method according to claim 1, wherein the lithium-substituted Nafion is dispersed in N-methylpyrrolidone in an amount ranging from 0.5 wt % to 2.0 wt % based on 100 wt % of N-methylpyrrolidone.

3. The method according to claim 1, wherein the active material is dispersed in the lithium-substituted Nafion dispersion in a weight ratio of the lithium-substituted Nafion to the active material ranging from 0.10:100 to 2.00:100.

4. The method according to claim 1, wherein each of the first lithium ion conductive composite material, the second lithium ion conductive composite material, the third lithium ion conductive composite material, and the binder independently includes:

a polymer blend which includes polyacrylonitrile and polyvinyl alcohol;

a lithium salt;

a lithium ion conductive ceramic filler; and a plasticizer.

5. The method according to claim 4, wherein polyacrylonitrile is in an amount ranging from 5 wt % to 95 wt % and polyvinyl alcohol is in an amount ranging from 95 wt % to 5 wt % based on 100 wt % of the polymer blend.

6. The method according to claim 5, wherein polyacrylonitrile is in an amount ranging from 5 wt % to 20 wt % and polyvinyl alcohol is in an amount ranging from 95 wt % to 80 wt % based on 100 wt % of the polymer blend.

7. The method according to claim 4, wherein the polymer blend is in an amount ranging from 30 wt % to 40 wt % based on 100 wt % of a combination of the polymer blend, the lithium salt, and the lithium ion conductive ceramic filler.

8. The method according to claim 4, wherein the lithium salt is in an amount ranging from 30 wt % to 50 wt % based on 100 wt % of a combination of the polymer blend, the lithium salt, and the lithium ion conductive ceramic filler.

9. The method according to claim 4, wherein the lithium ion conductive ceramic filler is in an amount ranging from 1 wt % to 30 wt % based on 100 wt % of a combination of the polymer blend, the lithium salt, and the lithium ion conductive ceramic filler.

10. The method according to claim 4, wherein the plasticizer is in an amount ranging from 1 wt % to 40 wt % based on 100 wt % of the polymer blend.

11. The method according to claim 4, wherein the lithium salt is selected from the group consisting of lithium bis-trifluoromethanesulfonimide, lithium perchlorate, lithium trifluoromethanesulfonate, lithium bis(oxalato)borate, lithium tetrafluoroborate, and combinations thereof.

12. The method according to claim 4, wherein the lithium ion conductive ceramic filler is selected from the group consisting of lithium aluminum titanium phosphate, lithium aluminum germanium phosphate, lithium lanthanum zirconium oxide, aluminum-doped lithium lanthanum zirconium oxide, gallium-doped lithium lanthanum zirconium oxide, niobium-doped lithium lanthanum zirconium oxide, lithium lanthanum zirconium tantalum oxide, lithium lanthanum titanium oxide, lithium phosphorous oxynitride, and combinations thereof.

13. The method according to claim 4, wherein the plasticizer is selected from the group consisting of succinonitrile, adiponitrile, lithium azide, poly(ethylene glycol), poly(ethylene glycol) diacrylate, triallyl isocyanurate, and combinations thereof.

14. The method according to claim 1, wherein the first metal foil includes a lithium foil, and the second metal foil includes an aluminum foil.

* * * * *